US010345050B2

(12) United States Patent
Pietsch et al.

(10) Patent No.: US 10,345,050 B2
(45) Date of Patent: Jul. 9, 2019

(54) HIGH DENSITY THERMAL STORAGE ARRANGEMENT

(71) Applicant: KELVIN STORAGE INC., Toronto (CA)

(72) Inventors: Anton Pietsch, Del Mar, CA (US); George W. Lynch, Escondido, CA (US); Stephen B. Sutherland, Aurora (CA)

(73) Assignee: Kelvin Thermal Energy Inc., Toronto, ON (CA)

( * ) Notice: Subject to any disclaimer, the term of this patent is extended or adjusted under 35 U.S.C. 154(b) by 372 days.

(21) Appl. No.: 14/409,898

(22) PCT Filed: Jun. 14, 2013

(86) PCT No.: PCT/CA2013/000574
§ 371 (c)(1),
(2) Date: Dec. 19, 2014

(87) PCT Pub. No.: WO2013/188954
PCT Pub. Date: Dec. 27, 2013

(65) Prior Publication Data
US 2015/0219404 A1    Aug. 6, 2015

(30) Foreign Application Priority Data

Jun. 20, 2012  (CA) ..................... 2780437

(51) Int. Cl.
*F28D 20/02* (2006.01)
*B60L 7/06* (2006.01)
(Continued)

(52) U.S. Cl.
CPC .............. *F28D 20/021* (2013.01); *B60L 1/02* (2013.01); *B60L 7/06* (2013.01); *B60L 7/14* (2013.01);
(Continued)

(58) Field of Classification Search
CPC ............. B60L 2200/26; B60L 2210/40; B60L 2250/12; B60L 2250/16; B60L 1/02;
(Continued)

(56) References Cited

U.S. PATENT DOCUMENTS 2,929,768 A * 3/1960 Haberer .................. G21C 1/16
376/327
3,624,356 A * 11/1971 Havill ..................... F24H 7/002
126/400
(Continued)

*Primary Examiner* — Tu B Hoang
*Assistant Examiner* — Joseph M Baillargeon

(57) ABSTRACT

An energy transportation and grid support system utilizes at least one transportable containment module capable of storing thermal or chemical energy typically produced from renewable or geothermal sources and providing connectivity with energy conversion equipment typically located in a land or sea-based operating facility. The system includes circuitry to hookup to an adjacent electricity grid for the provision of grid support and/or piping to move thermal energy typically used to drive steam turbines generating ' electricity. The operating facility also includes a communication arrangement to link with and exchange operations control data with a grid or heating operator and the energy transportation operator. The invention is directed to both apparatus and method for the energy transportation and grid support system.

17 Claims, 8 Drawing Sheets

(51) Int. Cl.
| | |
|---|---|
| *B60L 7/14* | (2006.01) |
| *B60L 7/22* | (2006.01) |
| *B61H 9/06* | (2006.01) |
| *H02M 7/217* | (2006.01) |
| *F28D 20/00* | (2006.01) |
| *B60L 1/02* | (2006.01) |
| *H02S 10/20* | (2014.01) |
| *B60T 1/10* | (2006.01) |
| *B60T 13/58* | (2006.01) |
| *F28F 21/02* | (2006.01) |

(52) U.S. Cl.
CPC ............... *B60L 7/22* (2013.01); *B60T 1/10* (2013.01); *B60T 13/586* (2013.01); *B61H 9/06* (2013.01); *F28D 20/0056* (2013.01); *H02M 7/217* (2013.01); *H02S 10/20* (2014.12); *B60L 2200/26* (2013.01); *B60L 2210/40* (2013.01); *B60L 2250/12* (2013.01); *B60L 2250/16* (2013.01); *F28D 2020/0082* (2013.01); *F28F 21/02* (2013.01); *Y02E 60/142* (2013.01); *Y02E 70/30* (2013.01); *Y02T 10/7241* (2013.01); *Y02T 90/16* (2013.01)

(58) Field of Classification Search
CPC ...... B60L 7/06; B60L 7/14; B60L 7/22; F28D 2020/0082; F28D 20/0056; F28D 20/021; F28D 2020/0026; F28D 2020/006; F28F 21/02; Y02E 60/142; Y02E 70/30; Y02T 10/7241; Y02T 90/16; H02S 10/20; B60T 1/10; B60T 13/586; H02M 7/217; F24J 2/34; Y02P 10/265; B61H 9/06
USPC ........... 392/339–346, 441–464; 165/10, 236, 165/902, 9.1, 9.4; 373/6, 120, 111, 76, 373/88, 93, 138, 140, 123, 115, 90, 81, 373/92
See application file for complete search history.

(56) References Cited

U.S. PATENT DOCUMENTS

| | | | | |
|---|---|---|---|---|
| 4,089,176 | A * | 5/1978 | Ashe | H05B 6/108 165/902 |
| 4,569,820 | A * | 2/1986 | Fortescue | G21C 3/00 376/381 |
| 4,837,230 | A * | 6/1989 | Chen | B32B 18/00 423/345 |
| 5,251,231 | A * | 10/1993 | Croker | C21D 9/22 373/109 |
| 6,741,632 | B1 * | 5/2004 | Dunn | H05B 6/22 373/138 |
| 2001/0047862 | A1 * | 12/2001 | Anderson | C04B 35/83 165/170 |
| 2009/0263708 | A1 * | 10/2009 | Bender | H01M 2/105 429/120 |
| 2011/0289924 | A1 * | 12/2011 | Pietsch | F28D 20/0056 60/682 |

* cited by examiner

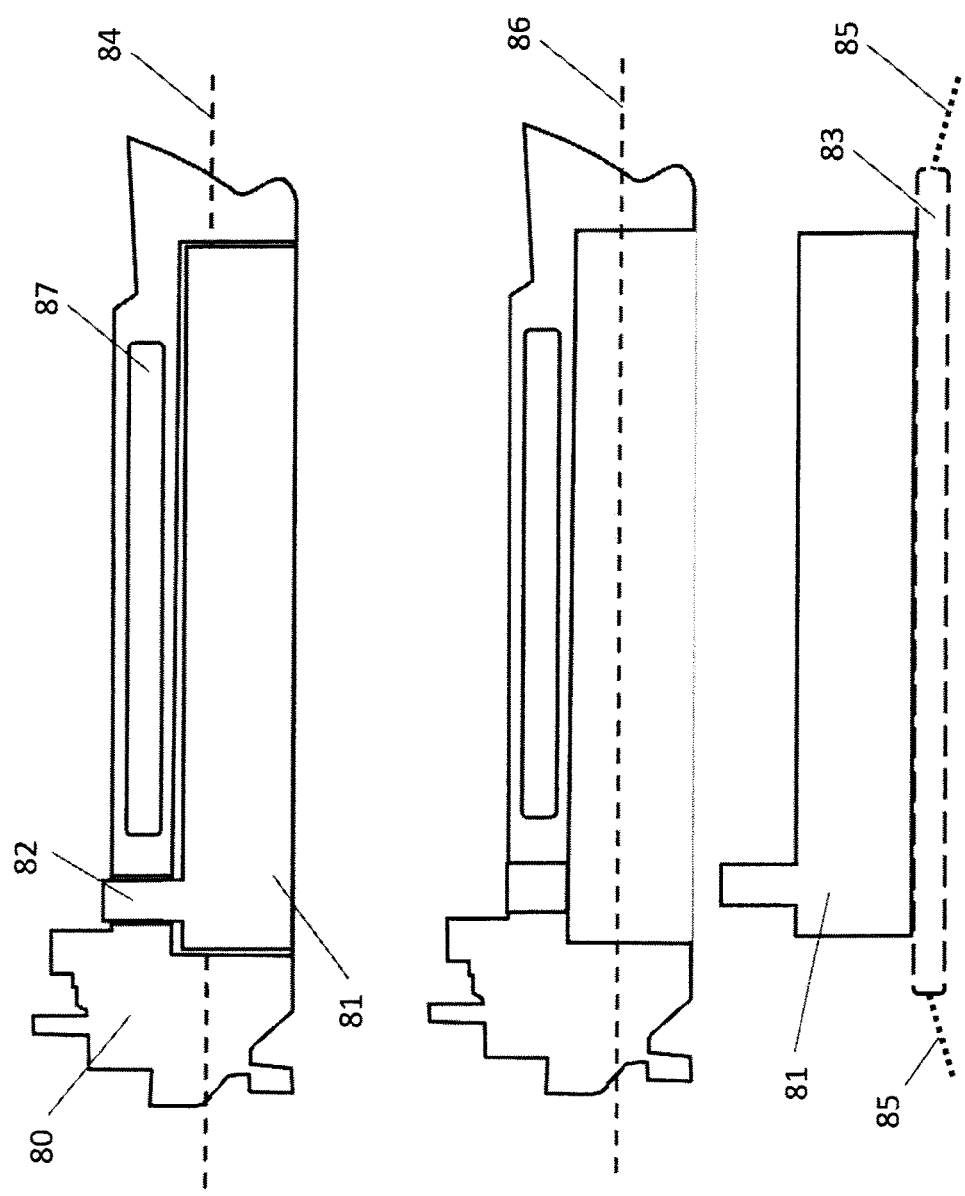

HIGH DENSITY THERMAL STORAGE ARRANGEMENT

FIELD OF THE INVENTION

The present invention relates to thermal energy storage using a graphite core. Effective thermal energy storage has particular application with respect to transportation and distribution of energy, stationary energy storage, electrical grid stabilization, and electrical transmission systems.

BACKGROUND OF THE INVENTION

Even the most optimistic forecasters of global energy supplies are concerned about the possible adverse societal effects of energy scarcity and rationing in the foreseeable future. Unless sustainable (ie: geothermal) and renewable (ie: wind, solar) energy production grows to meet a very significant portion of global energy demand within this century, every country will be impacted by energy scarcity in the coming years. Rising fossil fuel costs driven by continuously increasing global energy demand, coupled with progressively more challenging access to reducing planetary fossil fuel reserves, not only threaten the economies of nations forced to import much of their energy, but also threaten global trade and transportation.

Due to the geographical concentration of fossil fuels, the assurance of a constant energy supply in many regions of the world relies to a very significant extent on global fossil fuel deliveries and these primarily take the form of crude oil tankers which can typically carry up to 450,000 MT of oil or coal carriers up to 400,000 MT known as Chinamax ships. Hundreds of oil tankers are constructed every year with an average size of 75,000-100,000 MT with a typical lifespan of 25 years. Upon arriving at destinations, their crude oil must be piped to refineries and the resulting products are then typically trucked to points of use—all stages consume energy and emit air pollutants and in particular, the crude oil tankers are amongst the heaviest air polluters in the world.

To prepare for future fossil fuel scarcity while also meeting hydrocarbon emission targets dictated by immediate global warming concerns, it is now common for governments to make major investments or offer significant tax incentives to spur renewable energy development (such as wind and solar, and remaining hydropower opportunities) to augment traditional sources of electrical energy (such as coal, gas and nuclear generation) and also provide financial incentives for electric ground transportation (as the growth in consumption of fossil fuels is greatest for transportation). These renewable projects often require grid upgrades and in some cases, major new transmission lines to deliver energy to consumers which equal or exceed the cost of the renewable generation facilities.

To both reduce capital costs of constructing major transmission lines, and to waste as little as possible of existing energy resources by reducing transmission losses, utilities ideally locate the production of electricity as close to major demand centers (cities, industrial complexes) as possible. For example, in the case of electrical generation via the consumption of fossil fuels and other combustibles, these feed stocks are typically shipped to generation facilities and burned as close as possible to demand centers with the downside of municipal air quality degradation. Shipping of such fossil fuels to support the electrical grid as well as home heating and transportation has grown to a global energy re-distribution industry operating thousands of ships, trains, and transport trucks.

Renewable electric energy generation (other than the combustion of ethanol and other plant-derived feed stocks) has the potential to significantly reduce further air quality degradation and ultimately to completely eliminate energy security concerns. However, as the percentage of such generation to overall electrical generation on any given continental grid grows, it poses two key challenges to distribution systems: 1) It is often not possible to locate such facilities within close proximity to demand centers; and, 2) Most renewable sources other than geothermal (which is only commercially feasible in limited areas of the planet), produce at intermittent periods which often do not coincide with demand.

The promise of a future electrical grid primarily powered by or only powered by renewable energy requires—1) an effective arrangement to locate renewable energy facilities dose to demand and 2) effective energy storage facilities capable of fulfilling energy demands irrespective of oscillating renewable energy production levels. Improved thermal energy storage can assist in providing effective solutions.

The following table, modified from "Materials Selection in Mechanical Design, 4th Edition" by Mike Ashby (Granta Design), compares energy density achievable from a variety of sources of stored energy. This table details the stored energy density—but in the case of combustible or thermal sources (Gasoline, Rocket Fuel and Thermal Graphite Storage), not what can be effectively utilised as electricity with current energy conversion methods. For example, although Gasoline's energy density is listed as 5,500 kWh/ton, when Gasoline is combusted in an internal combustion engine driving an electric generator, only a small portion of its energy potential is ultimately available as electric energy since much of the stored energy is lost in the conversion process as waste heat. Likewise, thermal energy stored in graphite must go through a conversion process to net electrical energy when used for grid support and thus, the turbine or other heat engine efficiency (typically 30-60% within such heat engine's ideal operating temperature range) determines the net energy density. Net energy from various chemical/battery storage technologies is impacted by cell life, temperature, discharge rates, and the performance of other inter-connected cells—also dropping effective output from that predicted by ideal conditions in the table.

| | | | |
|---|---|---|---|
| Gasoline | 20,000 | 5,500 | Non-renewable. Oxidation of hydrocarbon: mass of oxygen not included. |
| Rocket fuel | 5,000 | 1,300 | Non-renewable. Less than hydrocarbon because oxidizing agent forms part of fuel |
| Thermal graphite | 3,800 | 1,000 | Can be heated and reheated from renewable sources. TMES system graphite core @ 2500 K - does not include insulation/containment module |
| Lithium-ion battery | 350-500 | 138 | Expensive, limited life, next generation |

| | | | |
|---|---|---|---|
| Flywheels | <400 | 111 | Attractive, but still in early demonstration |
| Ni—Cd battery | 170-200 | 55 | Less expensive, limited life, toxic chemicals, significant weight |
| Lead-acid battery | 50-60 | 16 | Less expensive, limited life, toxic chemicals, large weight |
| Springs, Rubber Bands | <5 | 1.3 | Inexpensive, limited life, much less efficient method of energy storage than flywheel |

To address the factor of an effective energy storage arrangement referred to above, it has been proposed to use graphite as a location flexible, high-density, long-life, environmentally responsible bulk energy storage medium for thermal energy sourced from both thermal and electrical supplies when such supply exceeds demand. An effective arrangement is disclosed in U.S. published application 2011/0289924 AI entitled High Density Energy Storage and Retrieval, the entire contents thereof is incorporated herein by reference. Energy stored in strategically located thermal-graphite systems may then be converted, via a host of available systems (broadly classified as heat engines which typically turn heat into mechanical motion necessary to drive electrical generators—such engines span from large supercritical steam turbines to small Stirling engines) to electrical energy on-demand, meeting electrical demand peaks and smoothing production drops typical of renewable generation, but also due to unexpected failures of conventional nuclear and hydrocarbon powered generating facilities. Nitrogen or an ideal gas mixture, as detailed in the above mentioned patent application, is used to draw energy from graphite which cannot contain any oxygen, since graphite will ignite in oxygen.

In addition to thermal-graphite energy storage systems, there are a host of energy storage systems available for both bulk, longer term storage (including pumped hydro, compressed air, and in some cases large-scale hydrogen fuel cell operations) and smaller, typically shorter term storage (including flywheels, batteries and other chemical storage systems including hydrogen fuel cells, and super-capacitors.

Unfortunately there remains the obvious requirement, common to all storage systems, for the critical provision of a suitable recharging period. Such period is effectively used when surplus energy (or the ability to generate such surplus energy on-demand) is available concurrently with suitable grid capacity to bring such surplus energy to the storage facility. Without such periods, storage systems are not recharged, and have less capacity to support the grid during times of low or zero renewable energy production. And unlike fossil fuels, when there is a shortage of renewable resources, there is no effective global transportation system which can move renewable energy to areas of need.

Today, grid-connected "spinning reserves" are maintained to fill these holes in supply which cannot be met by depleted renewable storage systems—the spinning reserves can be used to both stabilise grid voltages and recharge depleted storage systems. However, since such on-demand reserves are powered by fossil fuels, even with current fossil fuel global shipping operations, their availability in the future is uncertain in light of dwindling planetary fossil fuel reserves and increasing concerns about the air pollutants emitted during combustion of such fuels. Furthermore, powering spinning reserves with fossil fuels competes with the need for fossil fuels to be used for plastics and to power aircraft—both uses have no apparent substitutes and will thus pay whatever the cost to ensure priority supply.

In the absence of spinning reserves, many possible events, both predictable and unpredictable, reduce or eliminate critical storage recharging periods including:
1) Latitude dependent, seasonal reductions in solar and/or wind energy
2) Periodic prolonged periods of little or no wind or continued cloud
3) Massive storm centers which not only block solar energy, but exceed the wind tolerances of wind turbines, concurrently eliminating both forms of renewable energy
4) Environmental and equipment disasters leading to grid connectivity failures
5) Shortage of available land area for solar and/or wind installations of sufficient output to guarantee surplus charging periods
6) Failure of nuclear or other generation due to equipment breakdown or earthquake related events
7) Failure of grid infrastructure to expand with energy demand
8) Accelerated adoption of electric ground transportation—such vehicles, typically choosing to recharge at off-peak periods, reducing and possibly eliminating any available surplus There remains a need for grid support in periods, and at specific places, where the reduction or elimination of such recharging periods renders local storage systems inoperative and leaves the renewable-powered grid unstable. Currently, the only commercially viable forms of long-distance transport of energy to power grids under such conditions are pipelines, railcars, and ships designed to move fossil fuels. The present invention in a preferred embodiment provides an effective system for the storage and transportation of energy and a system for on-demand global transportation of renewable energy with adaptive grid support capability.

SUMMARY OF THE INVENTION

A thermal energy storage arrangement according to the present invention comprises a graphite core heated by electrical resistance heaters and has a series of gas flow circulation passages for removing heat from the graphite core. The graphite core comprises a series of graphite modules with each graphite module having a series of elongate graphite blocks arranged in a side by side configuration. Each module has a series of elongate gas circulating passages defined between adjacent graphite blocks. The series of gas circulating passages accommodate a circulating gas flow through the core to extract heat therefrom. The electrical resistance heaters are each located in separate heating passages in the graphite modules.

In an aspect of the invention, the graphite blocks are elongate cylindrical graphite blocks and each series of graphite blocks include a graphite fabric wrapped about a length of the elongate cylindrical graphite blocks of a respective module.

In a different aspect of the invention the graphite blocks of each module engage and cooperate with at least one adjacent graphite block to collectively define some of the series of gas circulating passages extending through the graphite core. Each gas circulation passage is defined by opposed partial channels between exterior surfaces of adjacent abutting graphite blocks.

In an aspect of the invention each elongate cylindrical block of a respective module cooperates with at least three adjacent elongate cylindrical blocks of the module to collectively define some of the series of gas circulating passages between the at least three adjacent elongate cylindrical passages that extend through the module of the graphite core. Preferably each module includes at least seven elongate cylindrical graphite blocks.

According to an aspect of the invention, an inlet manifold is connected to the graphite core and directs a source of circulating gas to one end of the graphite core and to inlets of the series of gas circulating passages. An outlet manifold is provided at an end of the graphite core and covers outlets of the gas circulating passages and directs circulating gas leaving the graphite core away from the graphite core.

According to a preferred aspect of the invention, the partial channels are half channels that extend fully across exterior surfaces of the graphite blocks.

According to a preferred aspect of the invention, the partial channels are half channels that extend fully across exterior surfaces of the graphite blocks.

In yet a further aspect of the invention each graphite block includes an exterior surface containing the partial channels with the partial channels being parallel to each other and extending in a length of the graphite block.

According to a preferred aspect of the invention the graphite blocks are of a hexagonal cross section and each side of the hexagonal elongate blocks includes at least one of the opposed partial channels.

In an aspect of the invention the graphite blocks are elongate cylindrical block grouped in an abutting parallel manner defining gas distribution channels between abutting cylindrical walls of the cylindrical blocks.

According to an aspect of the invention the partial channels include a suitable surface coating to reduce surface erosion of the opposed partial channels of the graphite blocks.

In yet a further aspect of the invention the graphite core includes no metal components.

In an aspect of the invention, the thermal storage arrangement is part of a mobile application or easily transported by truck, train, or ship. Such a mobile application preferably includes an operating capability to convert thermal energy derived from the graphite core to electrical energy.

In an aspect of the invention, the operating facility pushes energy into the graphite core of a containment module, taking electrical energy off the grid or thermal energy from solar or other sources and converting, as necessary, to thermal energy stores in the graphite core of the containment module thereby 'charging' it. The operating facility may also input or extract other substances during the charging process, as required by any energy conversion process.

In an aspect of the invention, the operating facility pulls energy from the containment module, converting to electrical energy as necessary for grid support or simply by extracting thermal or chemical energy for direct use by ancillary thermal or chemical processes. The operating facility may also extract by-products of the discharge cycle from the containment module.

According to a further aspect of the invention, the containment module may incorporate some or all aspects of the energy conversion operation in one or both directions (charging and/or discharging operations) whereby the operating facility monitors the rates of energy pulled and pushed to the containment module to be consistent with the modules' design parameters.

BRIEF DESCRIPTION OF THE DRAWINGS

Preferred embodiments of the invention are shown in the drawings, wherein:

FIG. 8 illustrates a containment unit transfer system.

DETAILED DESCRIPTION OF THE PREFERRED EMBODIMENTS

Renewable and sustainable energy, typically in the form of electrical energy, may be reliably produced for export/transport, depending on geography and climate conditions from solar, wind and geothermal sources. For example, Iceland has year-round sustainable geothermal energy production and in the sunny arid portions of Africa, plenty of land is available with year-round sun, for solar renewable generation.

Figure 1:
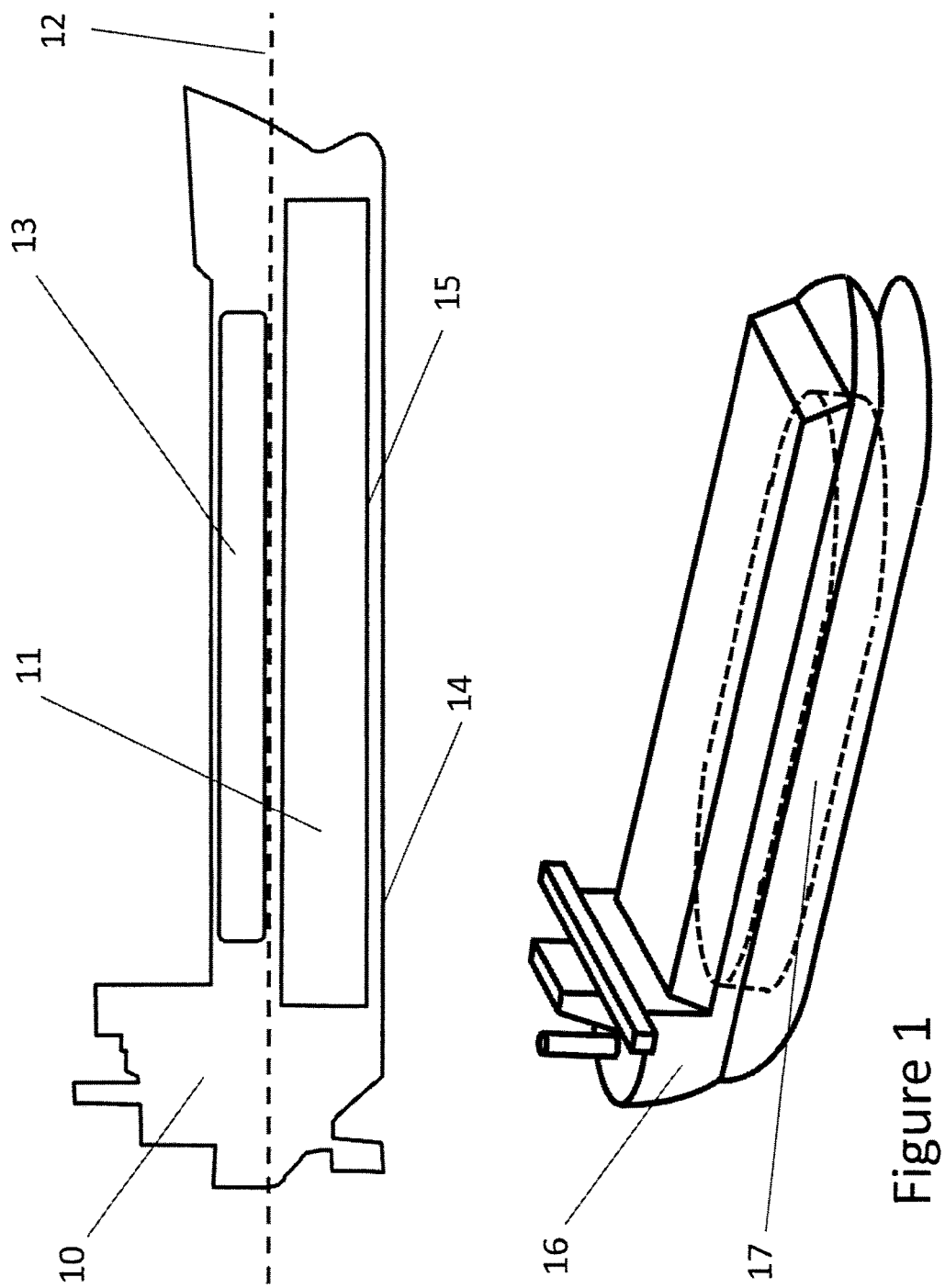
FIG. 1 illustrates two Chinamax-size ships, each containing a permanently installed containment module and operating facility.

A fleet or network of energy transport ships 10 illustrated in FIG. 1 are built to store and transport renewable and sustainable energy containing permanently installed containment modules 11. Each module may be a single integral containment module that is designed to remain as part of the ship. Each containment module houses a graphite core typically consisting of a series of graphite bundles which preferably sits below the waterline 12 to increase ship stability to minimise motion which could damage such core. The ships also contain operating facilities 13 which include energy conversion equipment, heat transfer equipment, gas purification systems, and grid connectivity control systems in addition to communications system. These onboard operating facilities enable the ship to charge and discharge energy from the containment modules for bulk operations (steady maximum rate charging/discharging of the energy store within the containment module or modules on board for the purpose of 'loading' before transit and 'unloading' after transit of the energy cargo) or for grid regulation (partial output to, or draw from, the attached grid for the purpose of electricity consumption load following to ensure grid voltage stability over a longer period of time). Since energy stored within the containment module is typically in a different form than the energy used for 'charging', output and input energy forms are independent.

The ship 10 in a preferred embodiment has a double water-tight hull 14 and the containment module includes 1 meter thick insulation inside walls 15.

Although the size of these renewable energy storage and transport ships is not fixed, it can be built to fit with "Chinamax" specifications limiting its total cargo to 400,000 MT, its width to 65M, length to 360M and draft to 24M enabling it to navigate key Chinese ports. Such a renewable energy storage ship would be configured to hold 360,000 MT of graphite (core of 250M length, 60M width, and 22.8M high including a 15-20% hollow gas passage volume). Raising the graphite to a maximum temperature of about 2500K, and assuming a multi-stage steam turbine operating with steam temperature of 600 degrees C., the graphite could be run down to 873K netting a temperature delta of 1627K. Using an average heat density over the graphite temperature range of 2000 J/kgK, provides a gross usable energy store of 325 GW-hr. With multi-stage turbine efficiencies of 60%, this mass of graphite nets a 195 GW-hr output and would be rated at 150 GW-hr usable storage.

The present invention can be readily adapted to new heat engine designs which, in some cases, are targeting to net high efficiencies, with claims to be approaching Carnot efficiencies, at lower input temperatures. Such heat engines could be inserted into the turbine's final stage exhaust stream to net further energy output, or the containment module simply designed to operate at a lower-heat range, reducing insulation and possibly other materials costs and structural considerations.

The slight positive pressure on the flat walls of the containment module is offset by the water pressure on the hull, so the costs of structural materials, in renewable energy ships with fixed containment modules are mitigated. The full radius on the ends of the graphite containment module 11 also shown in a perspective view 17 in FIG. 1 within another example ship 16 will hold the pressure without bending stresses in the tank. The top of the containment module is restrained by the cross beams that support the turbine deck (where a ship is outfitted with operating facilities) or simple cover structure, so having a flat top is again manageable. The turbines would be set on the deck, ideally about a meter below the waterline, so they will be stable at sea. The entire turbine deck is covered by an enclosed roof with sliding hatches for crane service when necessary.

Although any number of turbines may be installed to effect high output rates, the ship is preferably equipped with twin turbine/generator setups, each in the 500 MW to 1 GW range giving the ship a 1-2 GW output range which exceeds most grid peaker plants and is typical of undersea grid interconnects between countries. To extract the energy from the graphite, circulating fans push cooler gas exiting heat exchangers through the graphite (the air or steam moving through the turbines is heated through such sets of heat exchangers which are heated by a separate gas loop through the graphite). Some of the cooler gas entering the containment module is mixed with heated gas exiting the graphite gas loop. A variable mixing valve can thus ensure that the gas exiting the graphite is not too hot for the heat exchanger materials. The motor drives of these fans consume a small portion of the energy output, so the rate of gas flow through the graphite is controlled to minimise such energy use based on varying turbine demands and graphite temperature.

The multi-stage turbines can utilise additional thermal energy stored in the graphite, once the graphite core has fallen below 873K, by operating only their final low temperature stage, with a corresponding generator output rate reduction. Running the low temperature stage in one turbine to power the ship to and from its destination, by producing electricity for electric propulsion units, would be a normal operating procedure—on the return to its charging facility, this additional energy use doesn't impact the 'rated' storage available for commercial use. Note that this increased temperature delta achievable by running only the low temperature stage of the turbine as the graphite cools could be paired in a dual twinned turbine/containment module setup where initially one turbine would be operated until its graphite had been cooled to the point where its output drops and then the second turbine/graphite twin starts only when electrical demands exceed the lower output of the reduced first turbine and as necessary runs in parallel with the first until it too sees an output drop.

This setup could be used in cruise ships where maximum output is only needed during cruising and not while in port, typically each day. It could also be used for container ships, passenger ferries, and other shipping where renewable energy use was preferred over fossil fuel combustion.

For further safety while at sea, and as illustrated in many of the perspective ship views, each ship may be outfitted with a small smokestack and backup diesel generators to supply power to electric propulsion units. Diesel or other generators may also be used during movement of ships which have unloaded all removable containment modules, as more fully described later in this document.

The dual turbine design of the preferred invention offers a number of other advantages—as noted for example, in times of low energy demand, only one turbine needs to be operated. The two turbines also offer redundancy both while the ship is travelling between destinations, and while producing energy for grid support. In the event of unexpected failure or maintenance outage of one turbine or associated generator, the ship can continue to produce power at a reduced rate.

One Meter thick insulation having one or more layers of heat reflective graphite foil, high temperature tolerant graphite felt, or graphite foam, which may be optionally surrounded by lower temperature tolerant ceramic or glass fiber insulation batting, surrounds the graphite immediately inside the containment module, reducing thermal losses to less than 7% per month. This enables ships to support grids for prolonged periods when little demand is present—as might be the case during an unexpectedly windy period in places such as Norway where the majority of renewable energy is from wind installations.

Unlike crude oil tankers, in the unlikely event that such renewable energy transport ship were struck broadside by another ship or run aground and sunk or otherwise exposed the graphite to sea water, no chemical pollution and the corresponding long-term environmental damage would occur. However, there would be some steam released and heating of the water around the wreck. Over the days following such an accident the ship, assuming it sank while fully charged, would boil off one billion pounds of sea water, producing a steam cloud that would fill roughly a 1 kilometer cube. Since such steam production would happen relatively slowly, and since there would be no oil or other significant contaminants onboard, such event would not be seen as a major environmental disaster.

The operating facility on the ship also includes control systems which constantly monitor the grid and can react in an automated fashion while also receiving both generation and recharge commands from remote grid operators. When surplus energy is available on the grid, even for short times, where the ship is attached, it pulls energy to partially or fully recharge the graphite core by electrically driving resistive or optionally, inductive or plasma heaters. Likewise, when the attached grid needs support, the ship's turbines convert the thermal energy stored in the core to mechanical energy which spins generators to output electricity. Therefore in addition to the transport of energy, grid support to allow selective charging of the storage and selective energy removal from the storage is provided.

Unlike fossil-fuel powered grid peaker plants which cannot absorb excess energy and for correct emissions control, must operate within a fairly narrow output range, the renewable energy storage ship has a unique ability to dynamically vary input and output rates and instantaneously alternate between taking energy from the attached grid like a sponge, and pushing energy onto the grid as required. No other commercially-viable large-scale, bulk energy storage system can do this—although it is noted that if cost were not a factor, advanced battery systems could be constructed, but given today's battery technologies such would weigh roughly four times as much as graphite-based storage for the equivalent electricity output, would require massive fail-safe air conditioning and environmental support systems, would suffer reduced lifespan under such frequent charge/discharge cycling, and would represent a very significant environmental catastrophe in the event of fire or wreak. Furthermore, the advantages of the present invention include the fact that such renewable energy ship can take surplus energy off the grid even when it is fully charged.

The energy storage ship design of the present invention satisfies three key use conditions (flexible charge, discharge and over charge) via an integrated automated control system. By using modified electronics originally developed for electric car battery recharging and axial flux AC motor or brushless 3 phase DC motor control, the ship has the ability to dynamically vary the degree it is pulling energy from the grid by selectively energising heaters within the containment module. For short periods, assuming appropriate grid connectivity, it can take many times its output rate as input energy by energising all heaters at 100%. Normally, energy used for recharge purposes is rotated amongst all heaters registering graphite temperatures lower than the average graphite temperature so that the load on the grid dynamically follows surplus availability and pulls down voltage spikes such that the graphite core is evenly reheated wherever possible and time is given for heat to conduct from a heater into surrounding graphite. At any given time, only 1%, 5%, 25% etc. of the heaters may be engaged, and in many cases, not to the full duty cycle of the given heater. The circuitry for any given heater is thus also not run at its maximum current, increasing lifespan by decreasing circuit temperature.

In cases where a renewable-fed grid is swinging from surplus to deficit energy, as is typical of intermittent wind levels or clouds moving across the sky over a solar grid (or in cases of smaller grids, and even shipboard grids such as those found on cruise ships, where loads swing as individual systems such as HVAC cycle), a message can be transmitted to the ships control system from the grid operator asking for high adaptability availability. In this case, the circulation fans which move gas through channels in the core, will spin up to bring the heat exchanges to operating temperature and one or more turbines will spin to speed with lightly loaded generators. Electricity generated will be routed back into the heaters combining with electricity coming off the grid in periods of sunshine or high wind. However, as soon as the clouds begin to cover the solar field (or solar cells throughout a city) or wind level fall and grid voltages begin to drop, the ship's control systems will automatically, and progressively reduce its load on the grid to match solar production fall off—then, as required, start pushing energy onto the grid from the turbine while proportionally increasing the speed of the gas recirculation fan and retuning the gas mixing valve within the containment module to ensure that appropriate heat energy is available at the heat exchanger for turbine power as generation load increases. When the cloud clears and solar production surges (or wind production resumes after a lull), the control systems will dynamically and quickly reduce power output to the grid by rerouting electrical energy from the turbine/generator back into the graphite heaters and then also begin to take any surpluses off the grid, again adding this energy to generator energy going back into the graphite. At the same time, the control system will throttle back the gas recirculation fan and retune the gas mixing valve to reduce turbine/generator output.

In the special case where the graphite has been completely recharged, the renewable energy ship can continue to take power from the grid by continuing to drive its heaters in parallel with the gas recirculation fans to bring the heat exchangers up in temperature. The steam being heated by the heat exchangers will, however, not be used to generate electricity and in this case be directed to the condensers which use sea water for cooling. Essentially, surplus energy on the grid which cannot be absorbed by the graphite will end up passing through the condensers and into the sea around the ship. Although in many cases it is preferable to simply shut down wind turbines or disconnect solar cells from the grid to reduce surplus energy—this may not always be an option, especially in cases where cloud cover suddenly breaks over large solar fields.

It is particularly advantageous for the renewable energy storage ship to be able to periodically recharge, even if only partially, while connected and providing grid support. Upon arrival at the buoy (with the grid connect) or alongside a pier, fully charged to connect to the local grid, the ship offers 150 GWh of energy which, assuming it averages 1 GW output each day for 10 hours, enables it to support the grid along with a sister ship, also attached to the grid at this port, for approximately 2 weeks. Assume for the moment that this is a port of a major metropolitan center and two such renewable energy storage ships are grid connected, typically arriving and departing for recharging in a staggered fashion. If during the two week period however, higher than expected wind or sun enables periods of partial re-charging, the ships might suffer a net depletion much less than forecast. Now consider a similar dual ship setup located at a port a few hundred miles away which experiences significantly higher grid demands than forecasted due to overcast, calm days and nights where local renewable generation is failing to perform. By examining weather patterns and near-term predictions, the central renewable transportation operations facility dispatches a ship to the second location earlier than originally scheduled to compensate for the severe local renewable generation shortfall. However, due to travel distances, it then commands one of the ships at the nearby first port which has been able to maintain a high charge by recharging locally during periods of surplus energy, to go from the first to the second port where one of the ships assumes as much of the load as possible to drain its charge before detaching to return to its home recharging port. Later the fully charged ship arrives and takes the place of the second partially depleted ship which can then go to the first port where conditions continue to enable periodic recharging.

As previously mentioned, the operations facility onboard ship also includes a gas purification system which not only filters the gas circulating within the graphite core, but also continuously tests for contaminants and mixture ratios. Since the gas is made up of components of air, equipment onboard can replenish gas components as needed.

Figure 2:
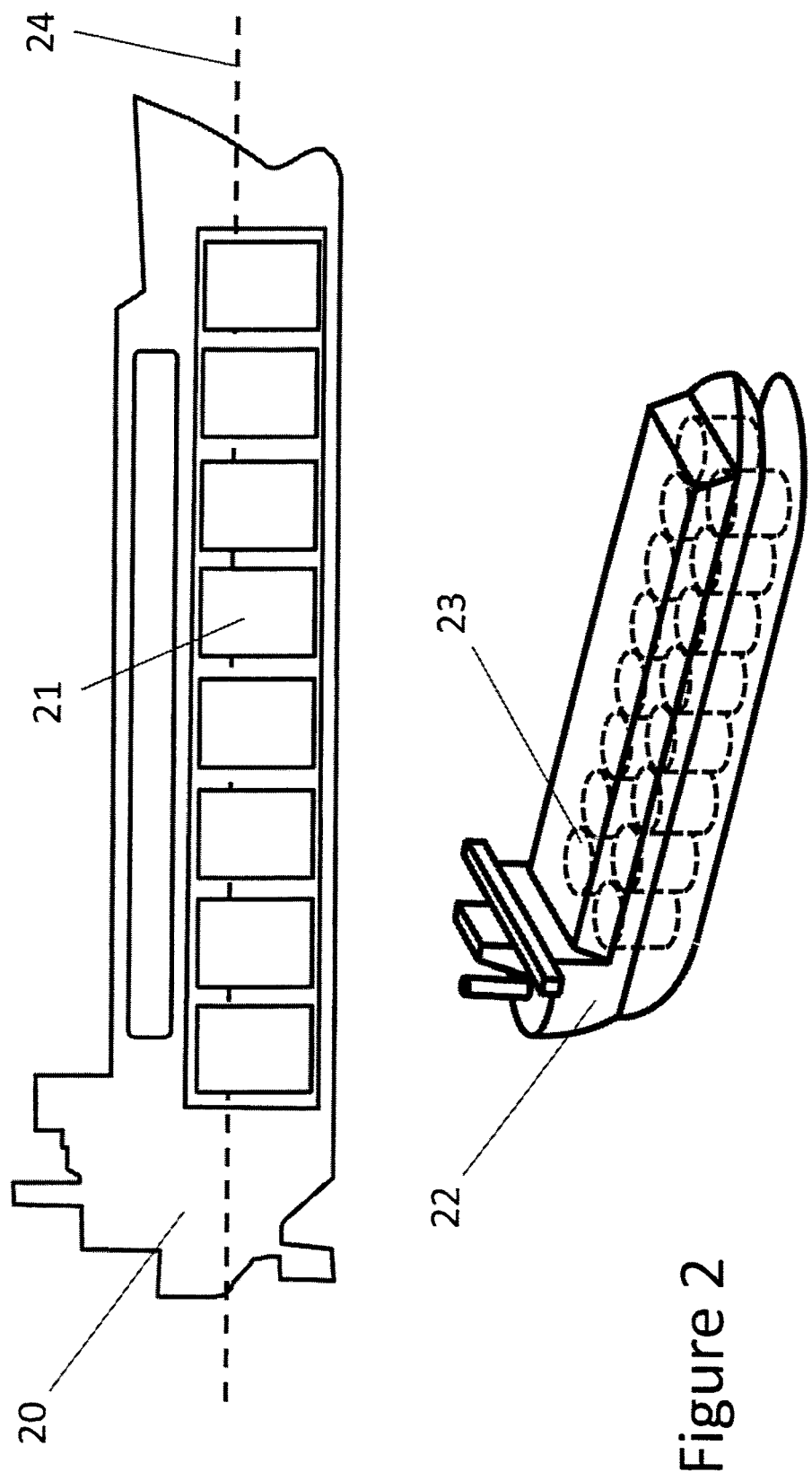
FIG. 2 illustrates two Chinamax-size ships, each holding removable containment modules. The first illustrated in a side view, and the second in perspective view, each with operating facilities.

Now looking at FIG. 2, this recyclable energy storage ship shown in side view in 20 and an alternate design shown in prospective view 22 holds removable containment modules 21 and 23. Although this storage ship also includes an operating facility complete with turbines, some such ships with removable modules do not contain such facility and can only transport the containment modules from facility to facility. The containment modules 21 and 23 hold insulated graphite cores and have embedded, closed circuit, gas circulation loops and related fan or fans, gas pressure and filter control systems, and heat exchangers such that no external connection of the gas loop to external devices are necessary except in special maintenance intervals, via service ports, when gas replenishment/recomposition may be necessary. This prevents oxygen or other contaminants from getting into the closed system from attached equipment in the field and prevents elements of the gas mixture protecting the integrity of the graphite from escaping during field operations. The turbine side of the heat exchanger includes field couplings, protected by covers during transport, available for connection with operating facilities, as are electrical connectors such that the operating facility can provide power for gas circulation fans and receive real-time data including fan RPM, temperature and pressure from within the containment module.

In order for a Chinamax ship with multiple, smaller removable containment modules to carry the same energy as one with a single module, the module size will necessarily be higher due to the increased non-storage volume necessary to not only structurally ensure the integrity of each module, but to individually incorporate appropriate insulation and other systems into each removable module and leave spare room between modules for inspection. Thus, as the effective storage density declines, the center of gravity of such a ship will be higher, resulting in more roll in heavy seas, which in turn requires additional structural materials in each core. Since the overall displacement of a Chinamax ship cannot increase beyond the specific established limits, the waterline 24 is effectively fixed and reductions to the storage capacity of the ship will be made to accommodate additional structural and systems weight.

The key advantage of removable containment modules is two-fold:
1) Upon a depleted ship returning to a charging port, the containment modules are swapped with charged modules, significantly reducing time at the charging port; and, 2) Removable containment modules may be dropped at shore facilities where energy can be stockpiled and then transferred and connected to local, land-based turbine/generator sets for grid support—thereby avoiding possible intermittent late arrival of renewable energy storage ships in the event of bad weather or unexpectedly high periods of demand.

Removable containment modules can also be offloaded on offshore platforms where operating facilities including turbines or other heat engines can produce electricity on demand for use on the platform, or transferred, via electric cable, to the mainland.

Removable containment modules, sized appropriately, can further be transferred to rail cars or trucks for deployment in both temporary and permanent generating facilities or to power transportation.

Before depleted containment modules are recharged, service ports on the side of the containment module enables the recharge facility to pressure-test the module, then test the existing gas for impurities which will indicate module health, and then replace the gas within such containment module while driving the fan or fans inside the containment module. During such automated process which occurs in an oxygen-free environment, the performance of the fan or fans is also tested by analysing the electronic signature of the fan motor and corresponding flow rate of gas. This renewal of the gas, before the containment module is recharged, ensures that every such module is up to specification before superheating the embedded graphite.

Also using the service ports, rather than charging the removable containment modules via electric input to internal heater systems, the removable containment modules could also be dropped at solar-thermal land or sea-based facilities, or a ship or transport with permanently installed modules could be parked such that access to these service ports is facilitated. High-temperature solar collectors (or other heat source) would charge graphite-based containment modules by directly accessing the service ports, running high temperature gas from solar collectors (or related external heat exchangers) directly into the graphite through gas passages usually used to bring gas to the internal heat exchangers within the containment modules during discharge cycles. In this reverse charging situation, gas mixing valves in the containment module close to isolate the graphite gas flow path from the internal heat exchanger and fan apparatus, enabling the reverse-direction flow of gas from the solar thermal installation to heat the graphite core, driven by external fans installed at the solar-thermal facility. The gas mixing values are also able to direct a small portion of such gas flow through the internal heat exchanger, such that shipboard (or other transit-board) energy conversion equipment (turbines, other heat engines) can produce electricity, in the event that either the solar-thermal installation has no native power supply to drive fan apparatus and the necessary electronic monitoring systems, or that such supply of electricity is more expensive than that produced from the energy conversion equipment.

In typical solar-thermal installations, the operating temperature of the solar-thermal panels will likely be less than the ideal maximum graphite core temperature requiring a boosting of the heat output from the solar-thermal panels before input to the containment modules during later stages of charging. Such heat boosting apparatus would normally not be included within the containment modules, to keep module cost and complexity to a minimum. However, certain heat-boosting designs might preferably be installed in close or direct proximity to the graphite core, and therefore could be installed within the containment modules. Any metal piping of gas from such heat boosters or other external heat sources (which could include fossil fuel combustion or super-heated geothermal sources) or their respective heat exchangers to the special service ports on the containment modules must be lined with graphite foam as the gas at maximum graphite temperatures must not directly contact metal.

Figure 3:
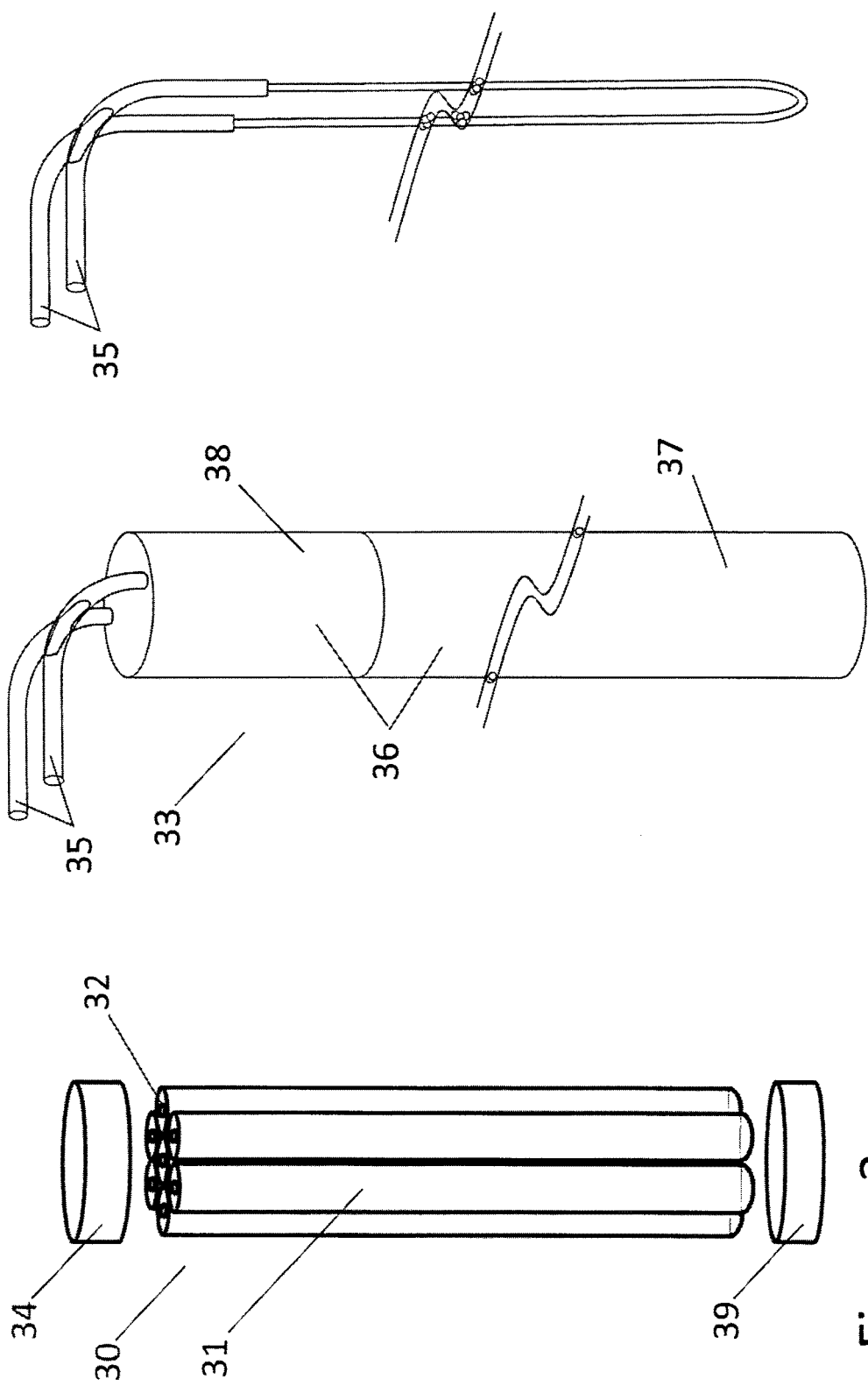
FIG. 3 is a perspective illustration of a bundle of graphite columns and a heater apparatus.

Graphite in the containment modules is typically made up of bundles 30 of graphite columns as illustrated in FIG. 3. In the preferred embodiment, each column 31 has one or more holes bored 32 where heaters 33 are inserted. The advantage of embedding the heating resistors within the graphite is that the gas circulating fan need not be continuously running while heating. Heater circuitry can measure current in each heating resistor and from this value, estimate the ability of a given resistor to input more energy into the graphite at a given precise location—such variations in the core temperature is expected, as will be apparent from the nature of the gas flow through the bundles 30 which cools portions of any given bundle adjoining incoming gas flows faster than portions near exiting gas flows. Alternately, heating resistors or inductive and plasma heaters may be distributed elsewhere within the containment module and using the gas circulating fan, distribute the heat throughout the graphite core. The disadvantage of this approach is that the fan will experience higher operating temperatures that it does during discharging and its duty cycle thus significantly lengthened—both factors increasing the maintenance load.

The heater 33 extends up through a top ceramic manifold 34 and rests on a lower ceramic manifold 39 and consists of an electrical conductor 35 that carries electrical current, such as tungsten or other metal commonly used for furnace heater elements. The thin section is the higher resistance section where most of the energy is dissipated and most of the heating takes place. The larger diameter section is for lower dissipation in the leads. The thin section may be straight or may be bent to increase the length of the conductor, such as spirally wound on one or both leads. The resistive section extends most of the way through the graphite core, stopping short of the bottom by about the radius of the ceramic covering 36, so that the conductor does not contact the support structure 39 beneath the core.

The conductor 35 is shown encased in two types of ceramic material, the lower section 37 being a ceramic with high thermal conductivity that aligns with the graphite core top and bottom surfaces. The upper section 38 is a ceramic with relatively lower thermal conductivity which meets the lower section 37 and extends up through the top manifold and gas conduit plumbing space into the insulation and aligns at or slightly below the insulation layer covering the top of the graphite storage within the containment module. The electrical leads extend above the thermal insulation of the storage where they can be clamped on to the electrical distribution conductor network at relatively low temperature. The diameter of the ceramic covered heater element is approximately one inch and its length will match the graphite core height, typically up to 20-40 feet plus the thickness of the top ceramic manifold, space above that for gas conduit routing, and then additional length to extend up through a portion of the insulation.

The ceramic heater assembly may be wrapped with supporting fibers for added strength for handling prior to assembly, and/or it may be infused with reinforcing fiber of shorter length, as is common in fiber reinforced molding materials.

Figure 4:
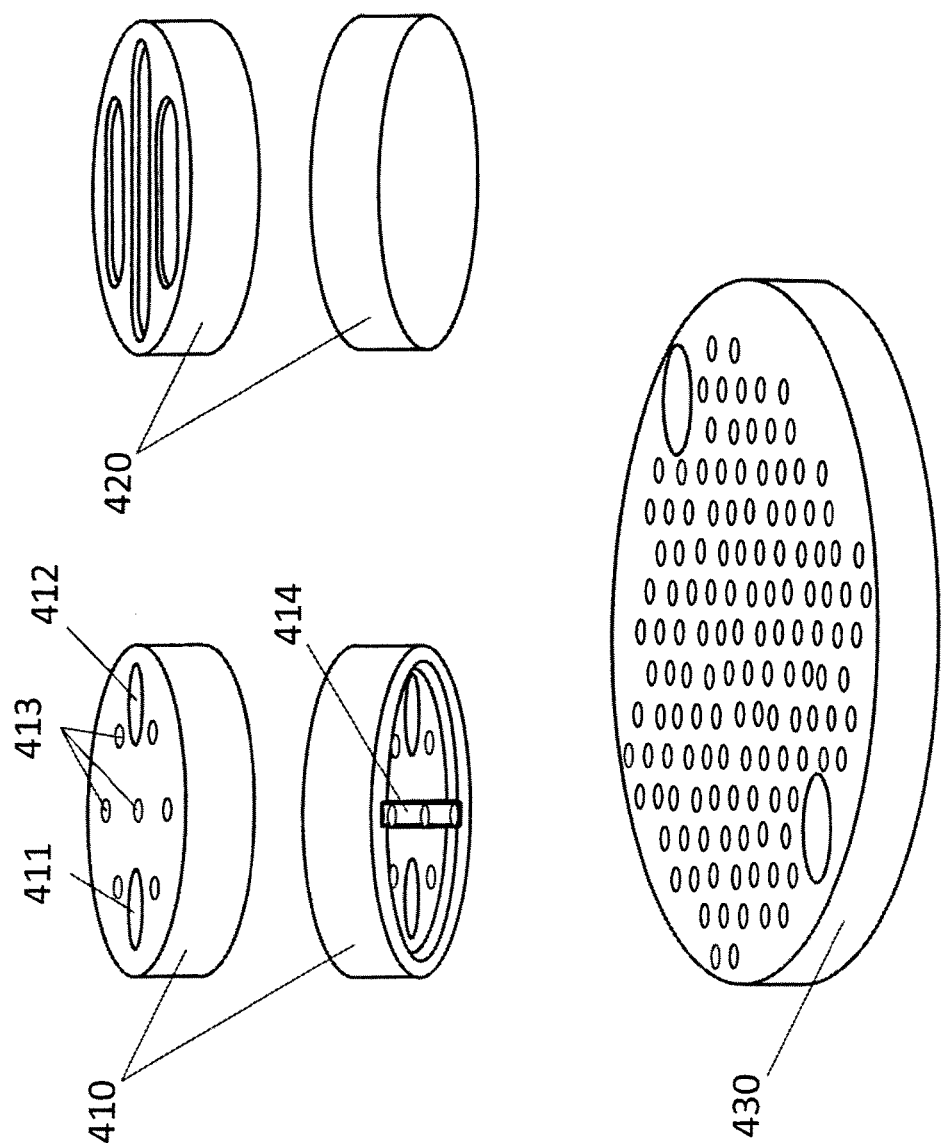
FIG. 4 illustrates the top and bottom manifold plates.

In FIG. 4, finer details of one embodiment of the upper and lower manifold plates are illustrated. The upper manifold plate 410 (illustrated in dual perspective view top and bottom sides) sits on top of the column assembly of graphite columns and directs the gas flow coming in one port 411 to the downward passages through the graphite columns—note the dividing ridge 414 which separates incoming from exiting gas and meets the top of the graphite columns. At the bottom of the assembly, the lower or base manifold plate 420 (illustrated in dual perspective view top and bottom sides) directs the gas flow from the downward flowing passages to the appropriate upward flowing passages. Once the gas has flowed back up those passages, it is consolidated in the right half of the top plate 410 and flows out the port 412 into the mating conduit.

These manifold plates 410 and 420 may be constructed of ceramic for more precise control of shaping for more complex gas flow arrangements which might include multiple gas input and output ports 411 and 412 and multiple dividing ridges 414 for very large bundles, or may be machined from graphite which contributes to the total mass of material available for storing energy. Note the small holes 413 in the Top Manifold 410 are the passages for heater rods 33 to be installed down into the core assembly and from which they can be removed for maintenance in the event of a heater rod failure. All the graphite passages through which gas flows are coated with a ceramic slurry to seal the surface so that graphite dust is not eroded from the surfaces during high gas flow operation. This slurry is fired to result in "green" ceramic prior to assembly of the graphite storage unit. During initial operation of the completed storage assembly, temperature ramps slowly cure the ceramic to its fully fired state giving full strength, and allowing mating ceramic surfaces to bond together providing gas seals between mating surfaces.

The simplified upper illustration 410 shows only resistive heater rod openings 413 for seven (7) columns of graphite and the accompanying gas passages; larger top 414 and bottom manifold assemblies of dozens or more graphite columns contain as many holes as resistors, with the input and output gas ports located between such holes. Since the entire storage containment vessel is pressurized to the level of the flowing gas, minor gas seepage around the openings is tolerated.

Figure 5:
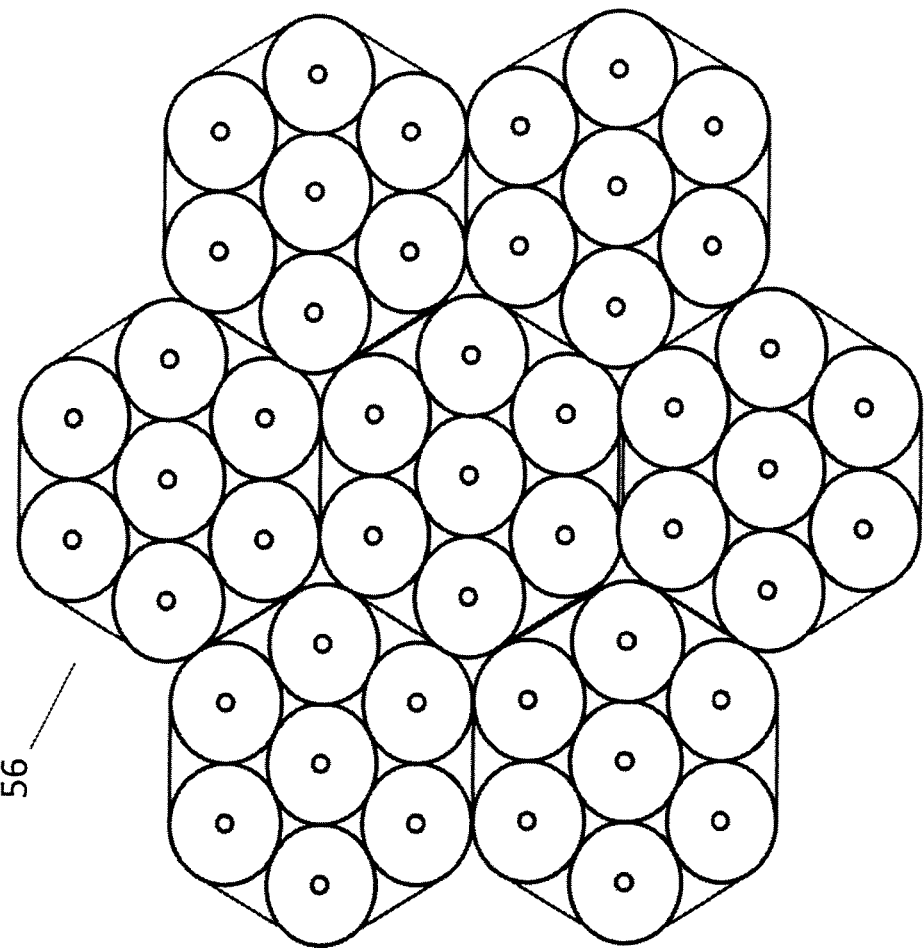
FIG. 5 illustrates the top view a single graphite column, a bundle of seven graphite columns, and a packing arrangement of 7 bundles of graphite columns.
Figure 5:
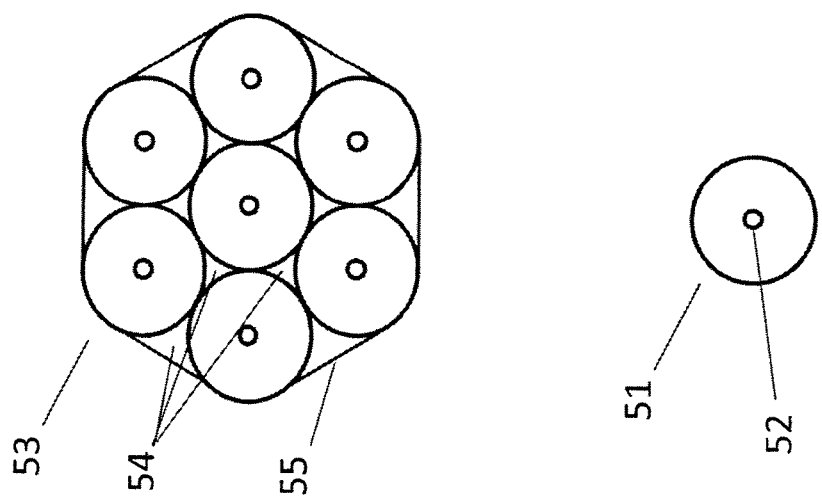

In FIG. 5, the top view of a single round graphite column 51 is illustrated with one bore hole 52 for the resistor tube heater. Each block has a resistor tube inserted through its length. The blocks could be the full length of the height of the core, or they could be assembled as a stack of blocks of shorter length optimize the manufacturing and assembly process. The whole assembly could be oriented so that the resistors and gas passages are vertical or horizontal, depending on the needs and space constraints of an application.

Figure 6:
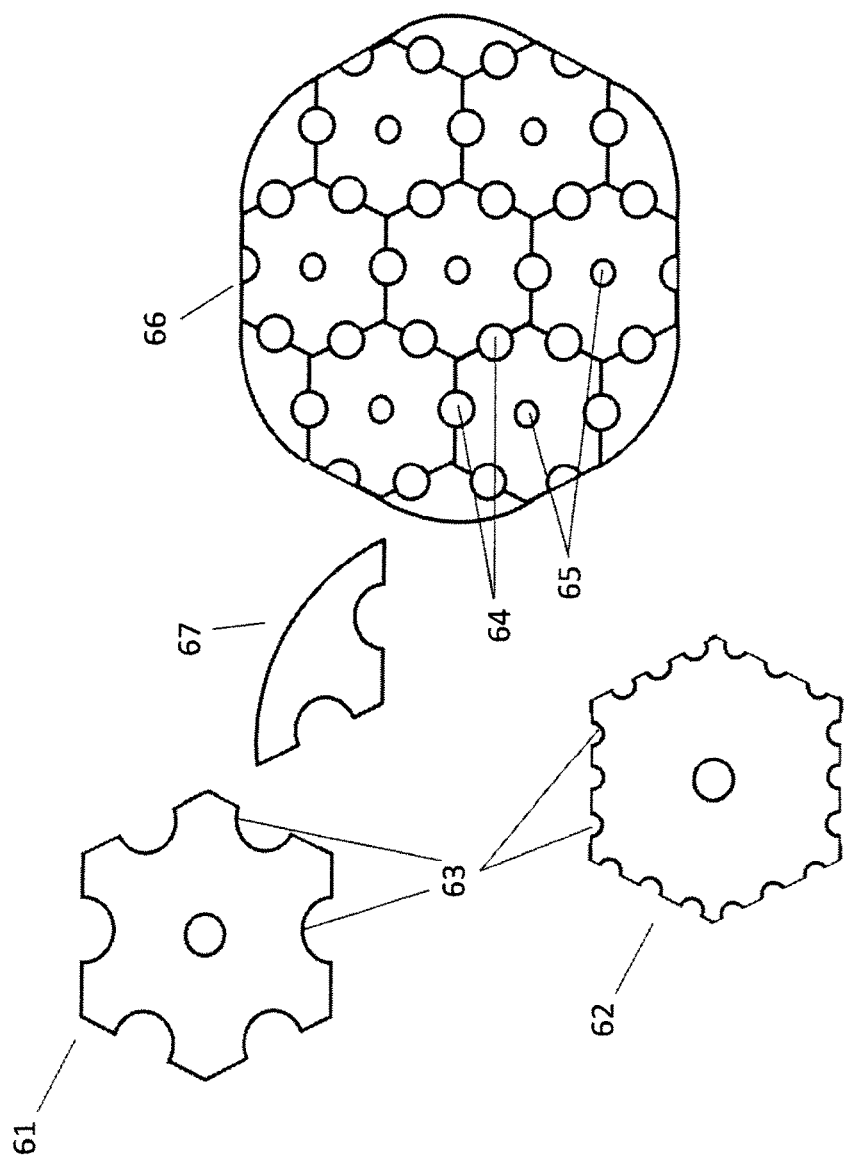
FIG. 6 illustrates a ship mooring at a grid-connected sea buoy.

Round graphite columns bundled in groups 53 of seven to create gas passages 54 from subsections of the storage which may be assembled into subassemblies which may be wrapped with graphite fiber cloth 55 which is secured by infusing ceramic material around the fibers to provide structural strength for convenience in handling and assembly, and to provide greater stiffening to resist sheer forces and possible shock loading in mobile applications including rough seas or earthquakes in the case of land installations. These subassembly bundles are then assembled into the form of the containment modules 56 and again wrapped with graphite fiber cloth and ceramic binder before being wrapped with insulation and then lowered into the containment module to rest on a formed ceramic plate sitting above the base insulation. Specially formed plates at the top and bottom of the graphite column assembly will direct gas flow through the spaces between the columns as required for a specific thermal storage arrangement. Such top and bottom plates may be formed from graphite or from ceramic materials. In a preferred embodiment, FIG. 6 illustrates alternate graphite column designs 61 and 62. These hexagonal blocks have gas passage cut-outs which require additional machining, but allows precise control of gas passage shaping and location. Multiple cut outs 63 on each face can allow for extensive control of the number of gas passages 64 and the ratio of heating resistors 65 to gas passages for each block when assembled into a bundle 66. For completion of the hexagonal pattern to allow efficiency in packing and ease of assembly, a second complementary form of block 67 is required which fills in the irregular surface created by the hexagonal columns and provides a rounded corner to the assembly such that graphite fiber can be tightly wound around the assembly.

Whereas the round graphite columns have the advantage of lowest cost post processing to obtain the finished block, the intercolumn gas passages which are formed by the assembly are defined by circular geometry to exactly $1-\pi/4$, or 21.5% of the core volume. In applications in which higher capacities are advantageous, such as space constrained ship containers for mobile thermal energy storage, higher core densities can be achieved by increasing the number of passages and reducing their diameter using the hexagonal technique which permits customization of the gas passage geometry. That customization comes at the cost of additional post processing to machine the specific shape required.

Graphite dust circulating with the gas and will increase maintenance cycles. The abrasive nature of the dust will wear fan blades and bearing surfaces as well as the interior surface of heat exchangers. The dust will also tend to build up in the heat exchanger. To minimize dust, after the columns of graphite are installed in the containment module, the graphite can be sprayed with a fine slurry of SiC of high purity. When heated in situ the SiC will bond to the carbon to form a skin that will prevent erosion. Boron nitride or boron carbide could also be used and commercially available boron-nitride paints can be sprayed on the individual graphite blocks as long as the minimum crystal size is under 1 micron. When it is dried it can be handled, and when it is fired in situ, it bonds to the carbon molecules for long term stable operation.

Comparing the round columns 51 of graphite with the hexagonal columns 61 reveals their strengths and weaknesses. Special wands will insert into gas passages 54 and 64 to spray the coatings on the graphite. However, the uniform and circular nature of passages 64 are preferable over passages 54 for the application of such coatings. Furthermore, the consistent size of such passages 64 is also preferential. But hexagonal columns 61 cannot be wrapped in bundles for additional strength and still tightly packed without the complementary blocks 67 which add to manufacturing costs by introducing an additional milled component. If wrapped and loosely packed, or only wrapped on the outer circumference of the graphite core within the containment module, the carbon fibre wrap must crease as it passes around pointed corners which will significantly weaken the wrap. Thus in cases where designs such as 61 are employed, the complementary blocks 67 with rounded sides will typically be included for outer bundle walls so that wraps can be applied without failure.

It is important to note that there are no metals in the core as at maximum operating temperatures of 2500K, anything in the core will be exposed to this high temperature for extended periods from weeks to months.

Allowance will be made for thermal expansion by placing graphite felt between bundles. Graphite has a very low coefficient of expansion, so small amounts of compressible felt can accommodate such expansion.

Figure 7:
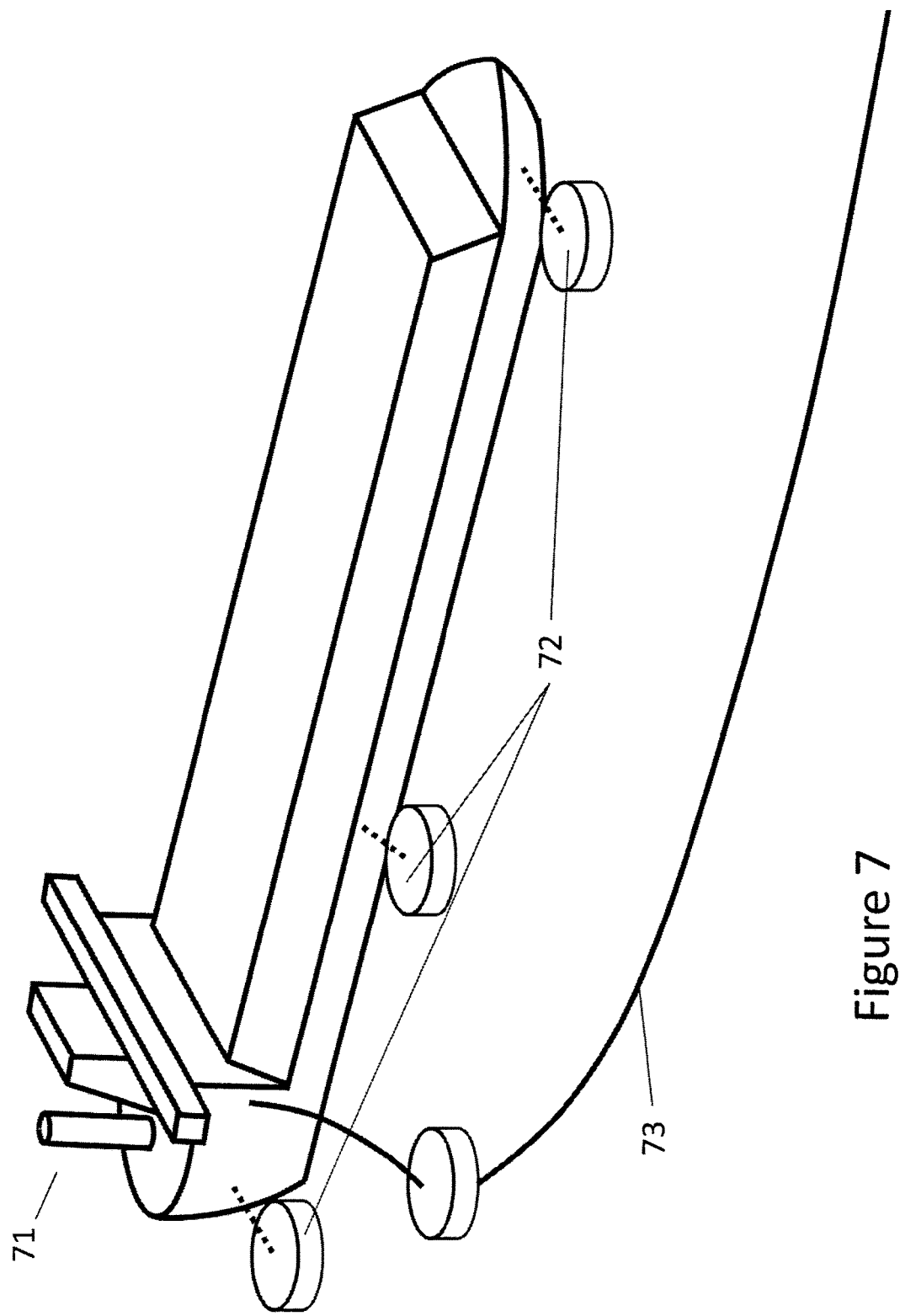
FIG. 7 illustrates a ship moored during energy transfer.

FIG. 7 illustrates the renewable energy ship 71 moored at anchored sea buoys 72 providing a grid connection 73. The underwater cable from the buoy to the grid must be capable of not only accepting the power transferred from the ship as limited by its turbine/generator sets, but also to be sized to ideally carry recharge energy at a rate meeting the ship's maximum energy input. This rate will typically be many times the output rate, as it is solely limited by the number of resistor tubes and the driving electronics. Since each resistor may be independently controlled and monitored by electronics in the operations facility, the failure of any one circuit or resistor heater will have only an extremely minor effect on the storage.

As illustrated in FIG. 8, a containment module transfer system enables ships to drop modules for recharging, powering a grid, or storage. Although removal of charged containment modules could be performed using overhead cranes after docking of the renewable energy transport ship, the weight and potential for shock to larger modules offering the maximum energy density storage makes these very large scale modules costly to manufacture and lift from a floating ship at dock.

According to the preferred embodiment of the invention, the under hull removal of a large, macro-sized module 81 is preferable to overhead crane systems. The macromodule 81 for a Chinamax ship would have approximate dimensions of 250M×4 M less than the beam of the ship×1.5 M more than the draft and is designed to be just slightly buoyancy positive, with the heat exchanger interface unit 82 rising above the surface of the water. When this seaworthy macro module is attached to the ship 80 it loads the rest of the hull with about 1M kg which lowers it in the water only slightly as illustrated by the waterline 84. When the module is released from the ship that weight is carried by the sub-sea platform 83, acting as an elevator controlled via ballast tanks so that there is negligible loading to the sea floor other than massive anchoring pylons which stabilize and level the whole system using automated control winches pulling cables 85 attached to the exterior corners of the platform.

During unloading of the macro containment module, the sub-sea platform 83 is raised against the ship 80 to raise the entire ship in the water and clamps on the sub-sea platform grip the macro module. With the macro module now joined with the sub-sea platform, the attachment bolts or clamps securing the macro module 81 to the ship 80 are released, releasing the ship. The platform 83 is then slowly lowered until the ship is floating free (with a shallower draft as illustrated by the slightly lower water line 86), yet still guided by rails extending down from the ship to guide the macro module until the platform is lowered and the module clears the ship. The ship then motors away using flywheel or other short-term renewable storage or relying on a brief period of diesel generator output, to the next such station where the process is reversed to load it with a completely charged energy storage module or another depleted module for a return trip for recharging.

The sub-sea platform then rises, slightly pushing the macro module above its floating point and a tender ship or tugboat tethers to the macro module. The clamps holding the macro module to the platform are released. The platform then lowers, enabling the macro module to float freely. As soon as it is clear of the undersea elevator, the next ship can have access to the elevator for unloading or another macro module can be placed above the platform for capture by the platform and the start of a loading process.

The loading process is similar to unloading—the platform with the macro containment module pulls the module down and the ship moves above. The ship would ideally be held stationary directly above the platform via thrusters and GPS instruments typically used at sea. The platform then rises and rails extended down from the ship guide the macro module into place and the platform continues to rise until the module is firmly seated. Bolts or clamps then grip the module and the platform lowers, slowly the ship bears the partial weight of the macro module, with the remainder being born by its buoyancy.

Macro modules are moved by tender ships/tugboats to and from weather protection docks for recharging, discharging, or storage. Access to the heat exchanger, and service port interfaces is protected by sealed doors which open above sea level for connections with energy conversion equipment.

The exchange of macro modules will typically occur in calm bays or during times of calm seas in more open areas. In the event of heavy weather, many of the renewable energy transport ships will have operating facilities 87 onboard so that they can attach to grid connected moorings to directly link with the grid in the event that macro modules cannot be unloaded.

In a further aspect of the present invention, such containment module transfer systems could also be used to move smaller containment modules into compatible ships which use these stores of renewable energy for propulsion and shipboard activities. These ships would incorporate an undersea berth for such modules such that the module could be moved into the berth while the ship was anchored, docked at a pier, or held stationary via thrusters. Alternatively, slightly positive buoyancy modules with variable ballast systems could be floated and locked into stern or side channels in such ships. In either case, 'refueling' could quickly occur during a partial day visit to port.

The containment modules contain graphite as described above but may contain other superheated materials, some of which may be in a pumpable liquid form. The containment modules could also include reactive materials which when combined, directly release electricity or produce high heat which is then used to drive suitable heat engines.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A thermal energy storage arrangement comprising a graphite core heated by electrical resistance heaters with heat being removed from said graphite core by a gas flow extraction arrangement; said graphite core comprising a series of column graphite modules with each graphite module having a series of elongate graphite column blocks arranged in a side by side cluster configuration with each graphite module including as part of the gas flow extraction arrangement a first series of gas circulating passages through said graphite module defined within said cluster configuration between adjacent graphite column blocks and a second series of gas circulating passages on an outer surface of said cluster configuration of said graphite blocks and connect to said gas flow extraction arrangement;

each graphite module including a top ceramic manifold and a bottom ceramic manifold that respectively cover and cooperate with a top and bottom end of said series of graphite blocks of said graphite column module;

each module having an oxygen free non-reactive gas controlled to circulate through the module and extract heat stored in said series of graphite blocks;

and wherein a top end of each elongate graphite column block includes a central passage extending in a length of the graphite block with one of said electrical resistance heaters being located therein with an end of the electrical heater extending through said top manifold; and wherein said graphite column blocks of each graphite module engage and cooperate with at least one adjacent graphite column block to collectively define said first series of gas circulating passages extending through said graphite core; and wherein said first series of gas circulation passages are defined by opposed partial channels between exterior surfaces of adjacent abutting graphite column blocks;

wherein each graphite module includes a cooperating graphite fabric wrapped about said elongate graphite column blocks to collectively define said second series of gas circulating passages located between said graphite fabric and said graphite column blocks;

said first and second series of gas circulating passageways extending between and connecting with said top and bottom ceramic manifolds; and wherein said first and second series of gas circulating passages include an erosion reducing high temperature coating of SiC, boron nitride or boron carbide bonded to said circulating passages of said graphite core.

2. A thermal energy storage arrangement as claimed in claim 1 wherein said graphite column blocks are elongate cylindrical graphite column blocks.

3. A thermal energy storage arrangement as claimed in claim 2 wherein each elongate cylindrical column block of a respective module cooperates with at least three adjacent elongate cylindrical column blocks of the module to collectively define some of said first series of gas circulating passages.

4. A thermal energy storage arrangement as claimed in claim 3 wherein each graphite module includes at least seven elongate cylindrical graphite column blocks.

5. A thermal storage arrangement as claimed in claim 1 wherein said top ceramic manifold directs a gas flow extraction gas to one end of said graphite module and said bottom ceramic manifold directs said gas flow extraction gas away from said graphite module.

6. A thermal storage arrangement as claimed in claim 5 wherein said electrical resistance heaters include graphite resistive heating electrodes located in said separate heating passages.

7. A thermal energy storage arrangement as claimed in claim 1 wherein each graphite column block includes an exterior surface containing said partial channels that cooperates with partial channels of adjacent column blocks to form said first series of gas circulation passageways.

8. A thermal energy storage arrangement as claimed in claim 7 wherein said partial channels are of a semi-circular cross section.

9. A thermal energy storage arrangement as claimed in claim 7, wherein said graphite column blocks are multi flat sided elongate graphite column blocks and adjacent multi-flat sided elongate graphite column blocks abut on a side thereof with some of said gas circulating passages defined therebetween.

10. A thermal energy storage arrangement as claimed in claim 9 wherein said elongate graphite column blocks are of a hexagonal cross section.

11. A thermal energy storage arrangement as claimed in claim 10 wherein at least one of said elongate graphite column blocks of each module includes adjacent elongate graphite column blocks thereabout such that each side of the at least one elongate graphite column block is in abutment with a side of one of the adjacent elongate graphite column blocks.

12. A thermal energy storage arrangement as claimed in claim 10 wherein each side of the hexagonal elongate graphite column blocks includes at least one of said opposed partial channels.

13. A thermal energy storage arrangement as claimed in claim 9 wherein said graphite fabric is applied about an outer surface of each module of elongate graphite column blocks and said graphite fabric is impregnated with a SiC coating.

14. A thermal energy storage arrangement as claimed in claim 9 wherein each side of said elongate graphite column blocks include a plurality of said opposed partial channels.

15. A thermal energy storage arrangement as claimed in claim 1 wherein said graphite column blocks are elongate cylindrical blocks grouped in an abutting parallel manner to define said first series of gas circulating passages between abutting cylindrical walls of said cylindrical blocks.

16. A thermal energy storage arrangement as claimed in claim 15 wherein each module includes a graphite fabric about said elongate cylindrical blocks that cooperates with said cylindrical blocks of said module to form said second series of gas circulating passages between the modules and the graphite fabric.

17. A thermal energy storage arrangement as claimed in claim 1 wherein said graphite core includes no metal components.

\* \* \* \* \*